(12) United States Patent
Garnaes

(10) Patent No.: US 7,283,913 B2
(45) Date of Patent: Oct. 16, 2007

(54) METHOD OF EXECUTING A LEAK CONTROL SYSTEM, AND A LEAK CONTROL SYSTEM FOR PERFORMING THE METHOD

(75) Inventor: Svend Eskil Garnaes, Svendborg (DK)

(73) Assignee: Dantaet Electronics A/S, Odense SV (DK)

( * ) Notice: Subject to any disclaimer, the term of this patent is extended or adjusted under 35 U.S.C. 154(b) by 0 days.

(21) Appl. No.: 10/561,316

(22) PCT Filed: Jun. 15, 2004

(86) PCT No.: PCT/DK2004/000414

§ 371 (c)(1),
(2), (4) Date: May 18, 2006

(87) PCT Pub. No.: WO2004/113863

PCT Pub. Date: Dec. 29, 2004

(65) Prior Publication Data

US 2006/0287837 A1   Dec. 21, 2006

(30) Foreign Application Priority Data

Jun. 20, 2003  (DK) .............................. 2003 00927
Nov. 11, 2003  (DK) .............................. 2003 01677

(51) Int. Cl.
G16K 31/02  (2006.01)
(52) U.S. Cl. .................. 702/51; 137/458; 137/486; 73/40.5 R
(58) Field of Classification Search .................. 702/51; 73/40.5 R, 40, 49.1, 198, 861.03, 861.77, 73/861.78; 137/313, 312, 314, 458, 557, 137/480, 460, 456, 488
See application file for complete search history.

(56) References Cited

U.S. PATENT DOCUMENTS 4,042,123 A * 8/1977 Sheldon et al. .......... 414/22.71

(Continued)

FOREIGN PATENT DOCUMENTS

JP          55006445 A       1/1980

(Continued)

*Primary Examiner*—Carol S. W. Tsai
(74) *Attorney, Agent, or Firm*—William J. Sapone; Coleman Sudol Sapone P.C.

(57) ABSTRACT

The invention relates to a leak control system (1) in two-stringed pipe installations and a method of executing a leak control system comprising one stop valve (2) with an associated flow meter (3) arranged in the supply pipe (4) of the pipe installation, and one stop valve (5) with an associated flow meter (6) arranged in the return pipe (7) of the pipe installation, said stop valves (2,5) as well as associated flow meters (3, 6) being connected to a control box (8), said box (8) comprising one valve monitor (9) connected to each stop valve (2, 5) to control/record the possible state of the individual stop valve (2, 5): open or closed, as well as an executer which, in combination with the control logics of the control box and the operating conditions of the pipe installation, controls/monitors the valve monitors (9) during a given sequence of actions, said leak control system (1) being capable of performing a number of measurements and data collections to evaluate the functionality of the stop valves (2, 5) and/or the elasticity and/or the tightness of the pipe installation. This provides the possibility of distinguishing between leakage proper and defects in the stop valves as well as the need for venting in the pipe installation and thereby a measurement area which begins at a low level, such that the comfort in e.g. a district heating system may be maintained.

10 Claims, 8 Drawing Sheets

U.S. PATENT DOCUMENTS

Figure 1:
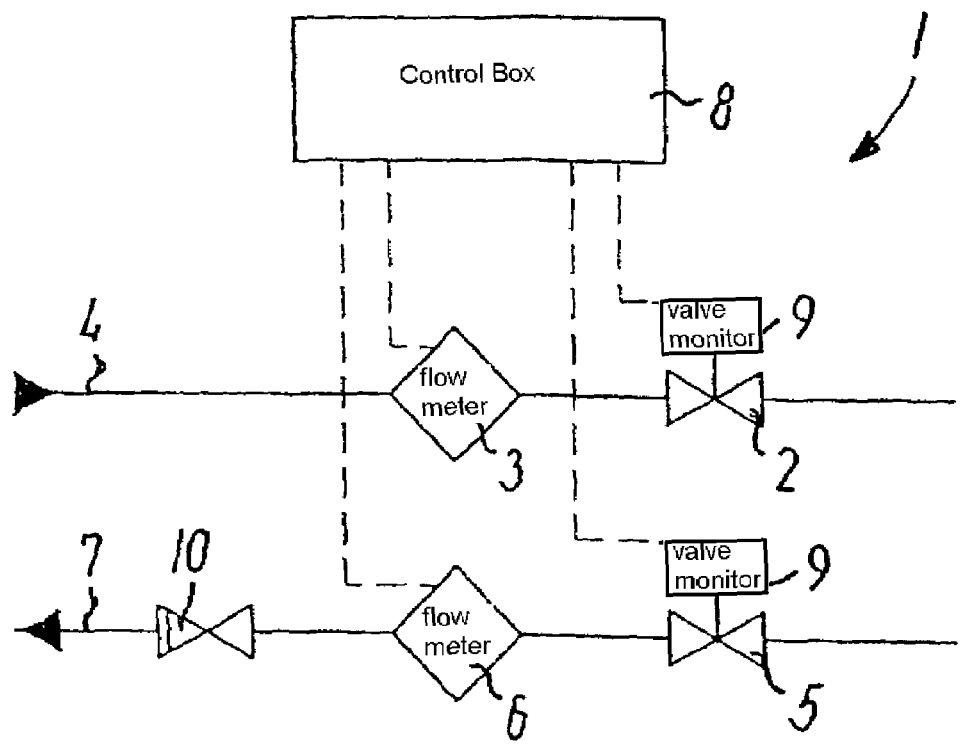

| | | | | |
|---|---|---|---|---|
| 4,043,355 | A | * | 8/1977 | Cerruti et al. ............... 137/312 |
| 4,825,198 | A | * | 4/1989 | Rolker et al. ............... 340/605 |
| 4,883,087 | A | * | 11/1989 | Nielsen ....................... 137/458 |
| 5,056,554 | A | * | 10/1991 | White ......................... 137/486 |
| 5,072,621 | A | * | 12/1991 | Hasselmann ............. 73/40.5 R |
| 6,134,949 | A | * | 10/2000 | Leon et al. ............... 73/40.5 A |
| 6,289,723 | B1 | * | 9/2001 | Leon ........................... 73/49.8 |
| 6,820,465 | B2 | * | 11/2004 | Summers et al. ............... 73/46 |
| 2006/0102153 | A1 | * | 5/2006 | Oda et al. ................... 123/468 |

FOREIGN PATENT DOCUMENTS

SU               1145210 A       3/1985

* cited by examiner

METHOD OF EXECUTING A LEAK CONTROL SYSTEM, AND A LEAK CONTROL SYSTEM FOR PERFORMING THE METHOD

PRIOR ART

The invention relates to a method of executing a leak control system comprising at least one stop valve with an associated flow meter arranged in the supply pipe of the pipe installation, and at least one stop valve arranged in the return pipe of the pipe installation, said stop valves and associated flow meters being connected to a control box.

Leak control systems have been commercially available for a number of years in connection with the indication of leakage in two-stringed systems. An example of this is known from U.S. Pat. No. 4,883,087. An essential feature of leak control systems is that they may not cause problems of comfort or doubt with the customer. It is important in particular that the leak control systems do not set off leak alarms that are caused by other (harmless) circumstances than leakages proper. Other circumstances may be elasticity in the protected pipe installation in the form of entrapped air and/or expansion sleeves, or it may be expansion tanks and differential pressure regulators which, in cooperation with fluctuations in the operating and/or differential pressure of the supply and abrupt fluctuations in the heating requirement, may cause transients and/or oscillations in the supply or return flow of the pipe installation, which can some times assume a size and an extent sufficient to make the leak control system respond to his.

For the reasons mentioned above, the sensitivity setting of the leak control systems thus reflect a compromise between the wish for limited escape at a leakage (high sensitivity) and the wish for high reliability and credibility (low sensitivity) of the alarm.

Leakage in pipe installations is normally the exception rather than the rule and thus means that, normally, an installed leak control system, after commissioning, does not claim the user's attention.

However, in the leak control system known from U.S. Pat. No. 4,883,087 it is not possible to distinguish between leakage proper and valve defects and air in the pipe installation without simultaneously increasing comfort and/or reliability problems.

OBJECT OF THE INVENTION

The object of the invention is to provide an improved and more sensitive method and a leak control system, where a number of measurements and data collections are carried out, which are subsequently analyzed to define the exact state of the valves as well as of the installation more precisely.

This object is achieved by a method of executing a leak control system of the type defined in the introductory portion of claim 1, wherein the control box additionally comprises at least one valve monitor connected to each stop valve to control/record the possible state of the individual stop valve: open or closed, and an executer which is started by the control logics of the control box in consideration of the operating conditions of the pipe installation, and which performs a given sequence of actions during which it controls/monitors the valve monitors, which leak control system, on the basis of start and execution of the sequence of actions, performs a number of measurements and data collections on the basis of which it subsequently evaluates the functionality of the stop valves and/or the elasticity and/or the tightness of the pipe installation.

Even quite small flows in the installation may be recorded by means of this method, just as control of the function, closing ability, of the valves may take place currently.

To ensure that the flow which may be recorded by the method in the supply string will not affect measurements in the return string, it is expedient, as stated in claim 2, that the stop valve in the supply string is controllable. It is important for the stop valve in the return string that the flow does not return and thereby affects flow measurements in the supply string, and the stop valve may thus be selected to be controllable, a mechanical non-return valve, or a combination.

Expedient embodiments of the method are defined in claims 3-7.

By constructing the leak control system as stated in claim 8, the system may distinguish between valve defects and leakage in the pipe installation when starting and executing the given sequence of actions by the executer. Individual blocking of the stop valve in the supply string of the installation, and optionally in the return string, for a specified period, enables detection of leakages of an unprecedented small size under favourable conditions. The favourable conditions comprise absence of elasticity in the pipe installation in particular.

By additionally introducing an analysis apparatus in the leak control system, as stated in claim 9, a so-called time track may be recorded in order to detect flow fluctuations in the pipe installation. On the basis of the flow fluctuation over a given period, or the absence of the same, the precise state of the pipe installation may be evaluated.

Expedient exemplary embodiments of the leak control system are defined in claim 10.

DRAWING

Figure 2:
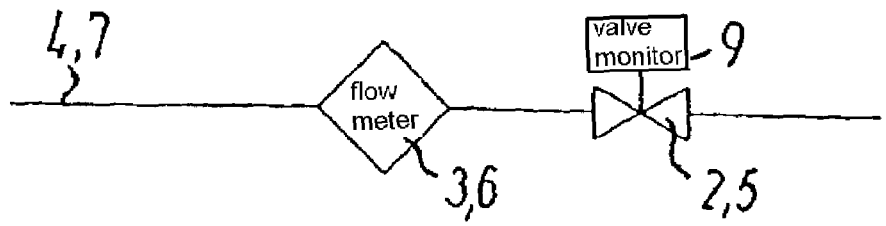
Figure 3:
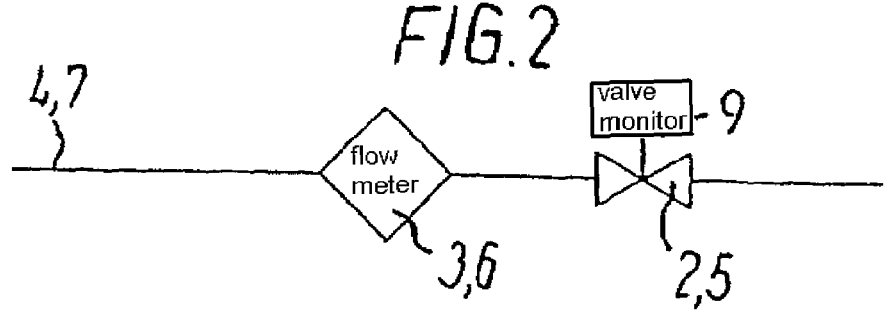
Figure 4:
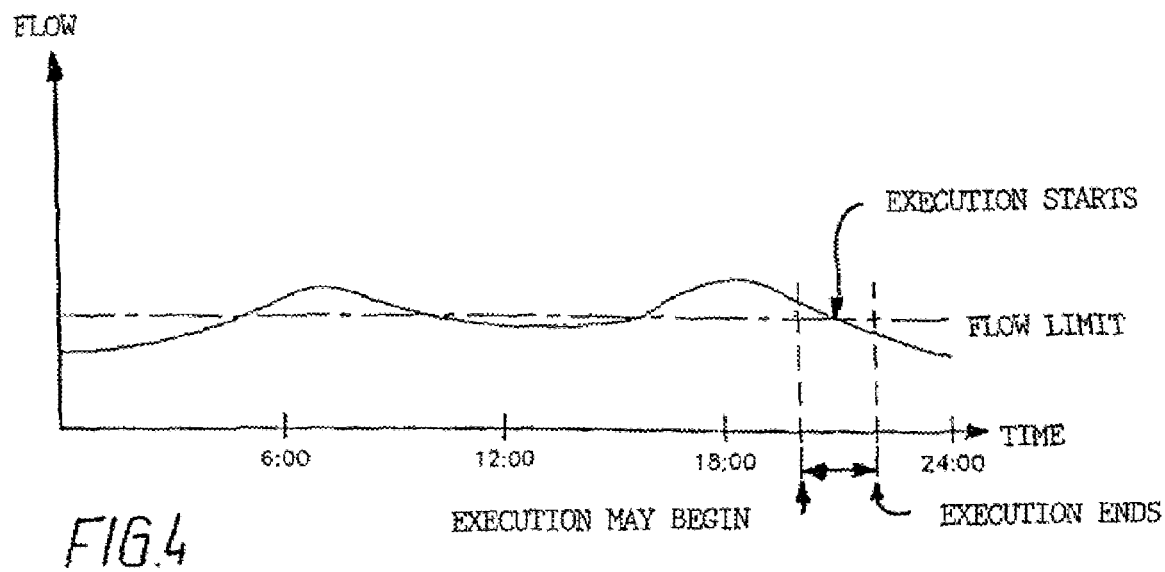
Figure 5:
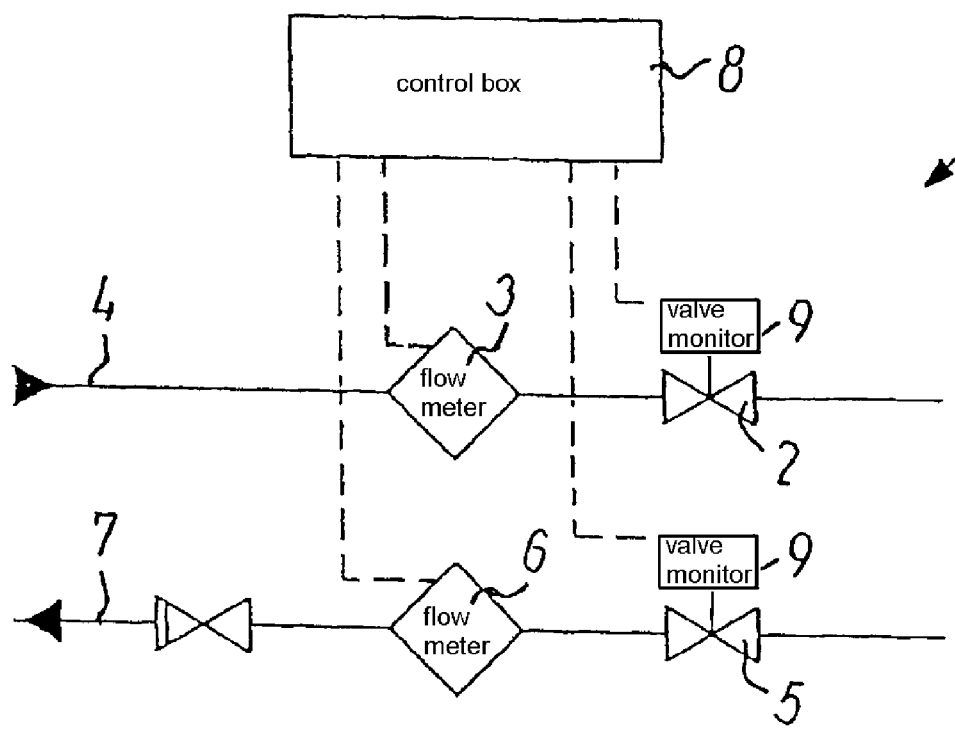

Exemplary embodiments of the invention will be described more fully below with reference to the drawing, in which FIG. 1 shows the essential components of a leak control system, FIGS. 2-3 show a measurement principle to indicate valve defects, FIG. 4 shows a period of time during which the leak control system is in a normal state, and the executer may be started, FIGS. 5-10 show the stages of the executer in connection with a valve test, and FIGS. 11-16 show the stages of the executer in connection with a tightness control, elasticity and valve test.

DESCRIPTION OF EXEMPLARY EMBODIMENTS

FIG. 1 shows the essential components of a leak control system 1 in pipe installations according to the invention. The leak control system 1 comprises a stop valve 2 and a pulse generating flow meter 3 in the supply pipe 4 of the pipe installation, and likewise a stop valve 5 and a pulse generating flow meter 6 in the return pipe 7 of the pipe installation. The flow meter 3 is arranged in series with the stop valve 2, 5 in the supply pipe 4 as well as the return pipe 7 of the pipe installation. As indicated by the name, the function of the flow meters is to measure a flow, in this case through each of the respective stop valves 2, 5.

The stop valve 2 in the supply pipe 4 of the pipe installation is a controllable valve, e.g. a motor valve, while the stop valve 5 in the return pipe 7 of the pipe installation may be a controllable valve, a mechanical non-return valve 10 or a combination thereof.

The pulse generating flow meters 3, 6 are preferably remotely recordable from a control box 8 comprising two valve monitors 9, one connected to each stop valve 2, 5. The control box 8 is capable of monitoring the functionality of the stop valves via the valve monitors 9.

In addition, the control box 8 comprises an executer (not shown) which controls/monitors the valve monitors 9 during a given sequence of actions in combination with the control logics of the control box and the operating conditions of the pipe installation. This establishes a form of adjustable state machine which may select one out of a finite number of possible sequences in view of the physical conditions measured and recorded en route. On the basis of the start and the execution of the sequence of actions, the leak control system 1 may perform a number of measurements and data collections to evaluate the functionality of the stop valves 2, 5 and/or the elasticity and/or the tightness of the pipe installation.

The executer thus controls the chain of events that make it possible to distinguish between actual defects in the stop valves 2, 5 and leakage in the pipe installation as well as the need for venting in the pipe installation, thereby providing a finer sensitivity setting without simultaneously increasing comfort and/or reliability problems. The executer may thus decide the details of the execution for the leak control system 1 in combination with the control box 8.

The executer is started when the leak control system 1 is in a normal state, that is within a specific period of time where the load of the pipe installation is expected to be minimum, if the recorded flow through the stop valves 2, 5 gets below a certain limit which may be adjustable. This is illustrated in FIG. 4. If this condition cannot be satisfied on a given day, the execution may be postponed 24 hours. The control box 8 sets an upper limit, which may optionally be adjustable for the number of days the execution may be postponed, following which it will forcibly start the execution no matter whether the flow is higher than the limit.

The executer starts by performing either a valve control alone where the functionality of the stop valves 2, 5 is tested, or a valve control and/or the elasticity and/or tightness of the pipe installation. The start used depends on the setting by the control box 8 of the actual calendar month which is reported by the real time clock of the control box and/or an external signal which is applied to a control input (not shown in the drawing). The purpose of this arrangement is to make it possible to restrict the time which the pipe installation has to be shut-off during the cold season so that the execution does not cause damage to e.g. calorifiers mounted on the roof in case of high wind and low outside temperature.

If the above-mentioned risks are of minor importance, it is possible to start the executer such that several or all of the stated controls may be performed. The executer thus depends on the risks that might be present at the start.

By performing monitoring/control of the stop valves 2, 5 alone, it is ensured that possible dirtying of one or both of the stop valves 2, 7, which prevents this/these from closing tightly, is detected at the time of the control, rather than at the time of a possible leakage where a valve defect is extremely inexpedient.

Figure 10:
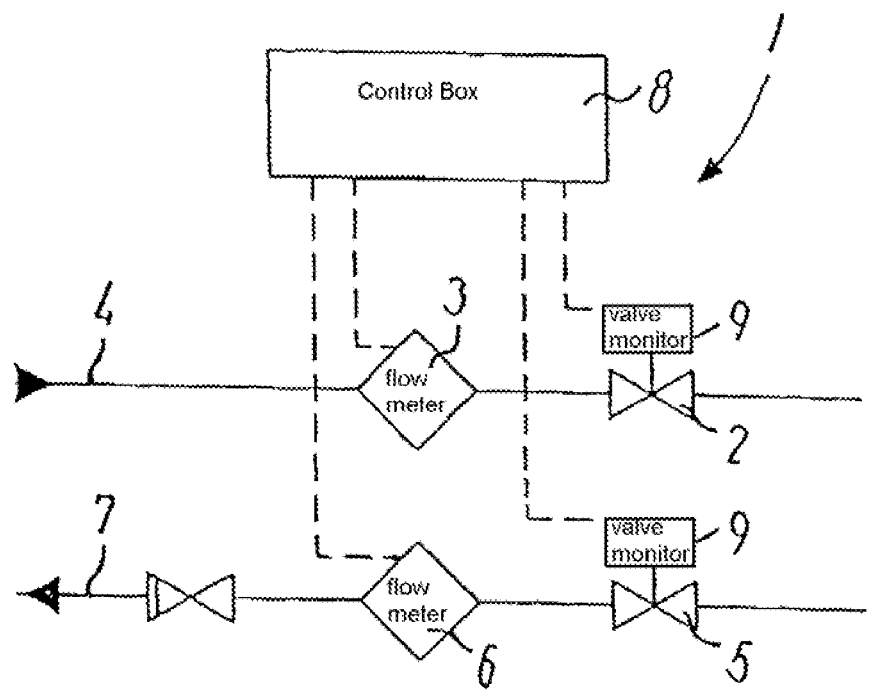
Figure 11:
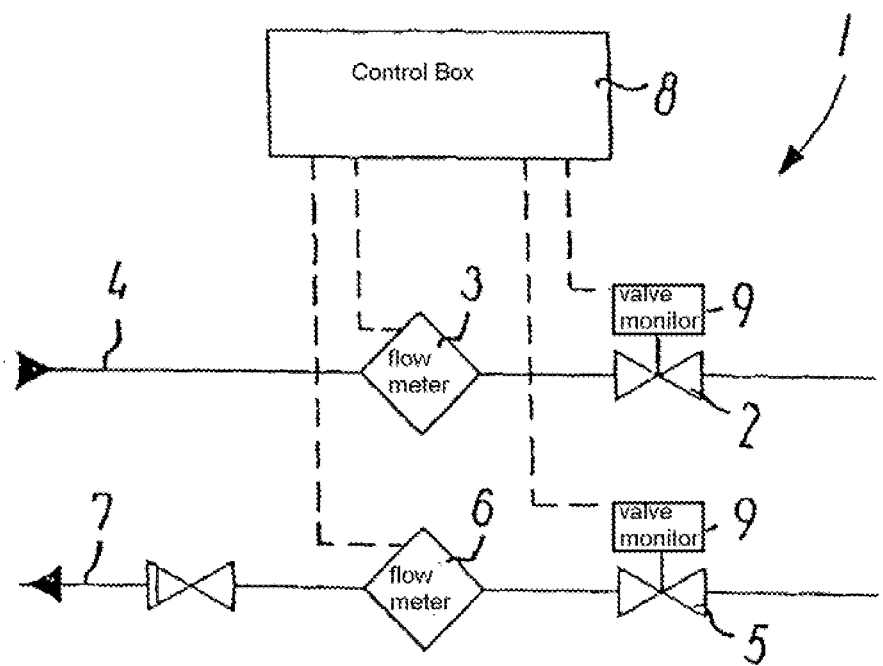

The functionality becomes operative whenever the stop valves 2, 5 are known to be closed, i.e. after the transit time, i.e. after the time where a stop command is applied and the stop valve has actually closed. In this state, the stop valve 2, 5 is thus expected to close tightly. Whether the stop valve 2, 5 is leaky and thereby defective, is tested in each branch, and in the situation where the stop valve 5 in the return pipe 7 of the pipe installation is not controllable, the test is carried out during the execution of a given sequence of actions by the executer in that:

the executer applies a close command for the stop valve 2 in the supply pipe 4 of the pipe installation and awaits the expiry of the transit time of the stop valve (see FIG. 7), the executer keeps the stop valve 5 in the return pipe 7 of the pipe installation closed for an adjustable period of time during which the valve monitor 9 for the stop valve 5 is active (see FIG. 8), the executer removes the close command for the stop valve 2 in the supply pipe 4 of the pipe installation and deactivates itself (see FIG. 9), following which the leak control system 1 assumes a normal monitoring state where a flow may be recorded in the supply pipe 4 of the pipe installation as well as its return pipe 7 (see FIG. 10).

Figure 6:
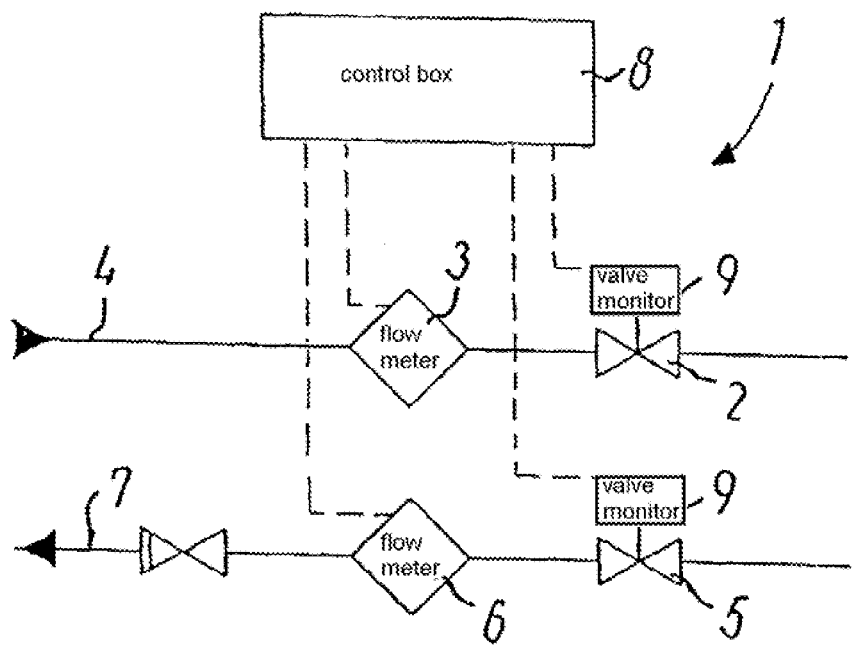
Figure 7:
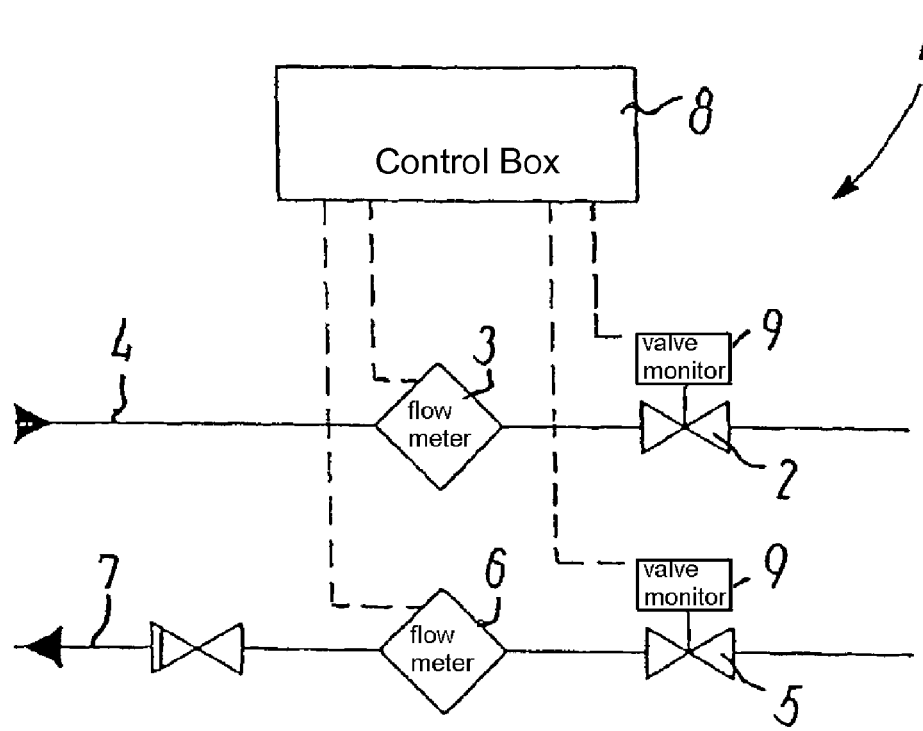
Figure 8:
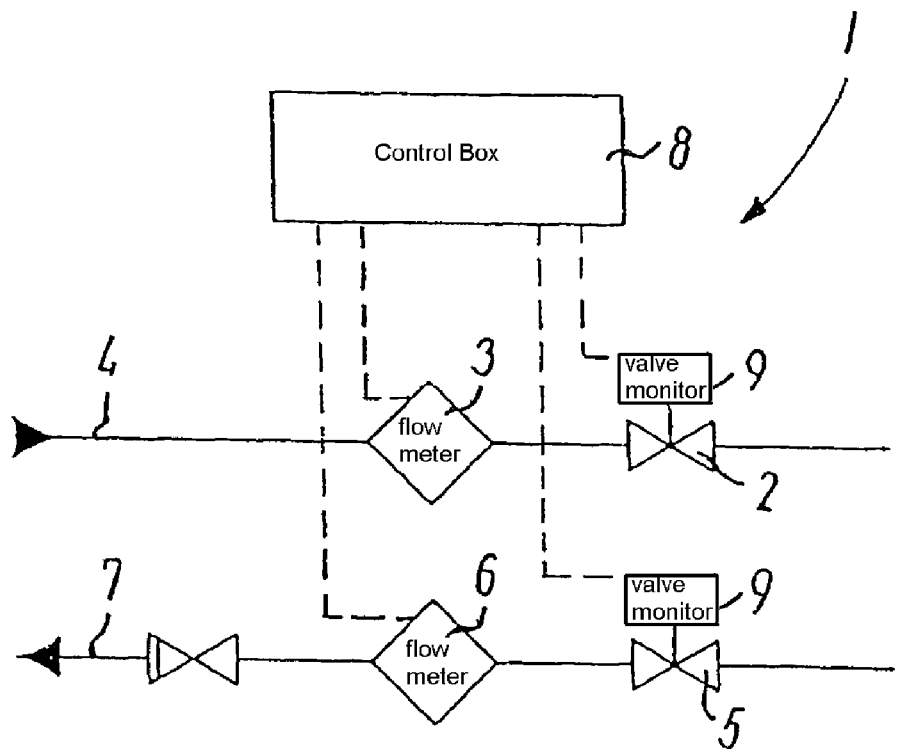
Figure 9:
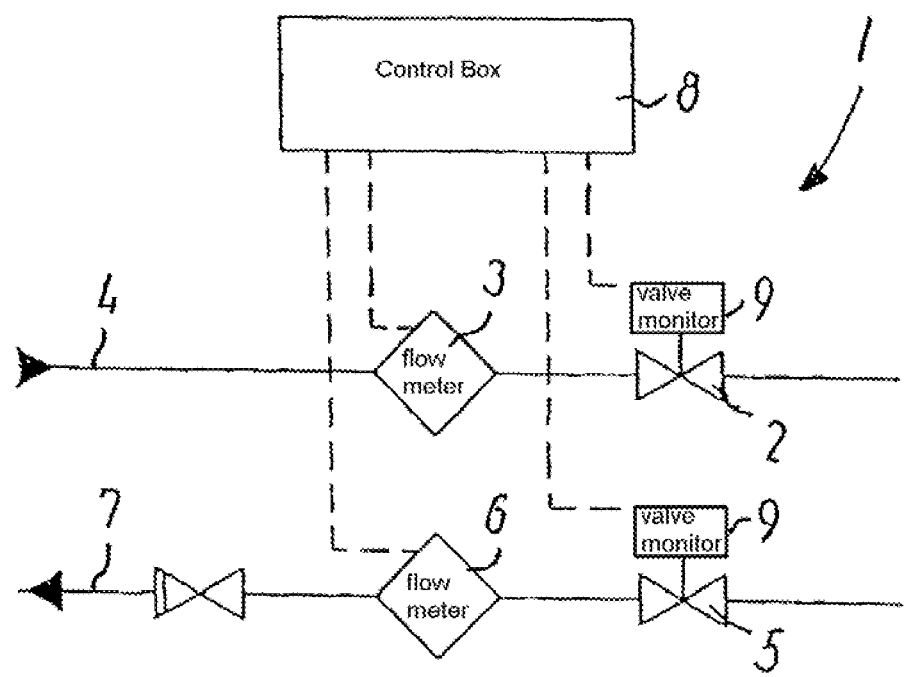

In the case where the stop valve 5 in the return pipe 7 of the pipe installation is controllable, the test is initiated in that:

the executer applies a close command for the stop valve 5 in the return pipe 7 and awaits the expiry of the transit time of the stop valve (see FIG. 5), following which the executer keeps the stop valve 6 in the return pipe 7 of the pipe installation closed for an adjustable period of time during which the valve monitor 9 for the stop valve 5 is active (see FIG. 6).

It will appear from the foregoing that if a close command has been applied and a flow is recorded through the flow meter 3, 6 after the expiry of the transit time, the stop valve 2, 5 is defective, and the control box 8 applies a system error alarm and shuts off the system. This measurement principle is illustrated in FIG. 3.

Correspondingly, the stop valve 2, 5 will be in order if no flow through the flow meter 3, 6 after the expiry of the transit time can be recorded/measured. This measurement principle is shown in FIG. 2. Whether a stop valve 2, 5 is defective, may thus be detected in connection with any type of system shutoff, manually via control panel, via remote control or automatically via the executer or other monitors.

As mentioned before, several controls may be performed at a time, if this does not involve any noticeable risks. For the collected recordings/data collections to be evaluated optimally in connection with these controls, the control box 8 comprises an analysis apparatus (not shown). This analysis apparatus allows analysis of the temporal variation of the flow on recorded time tracks and on the basis of this an exact analysis of the state of the pipe installation.

Figure 16:
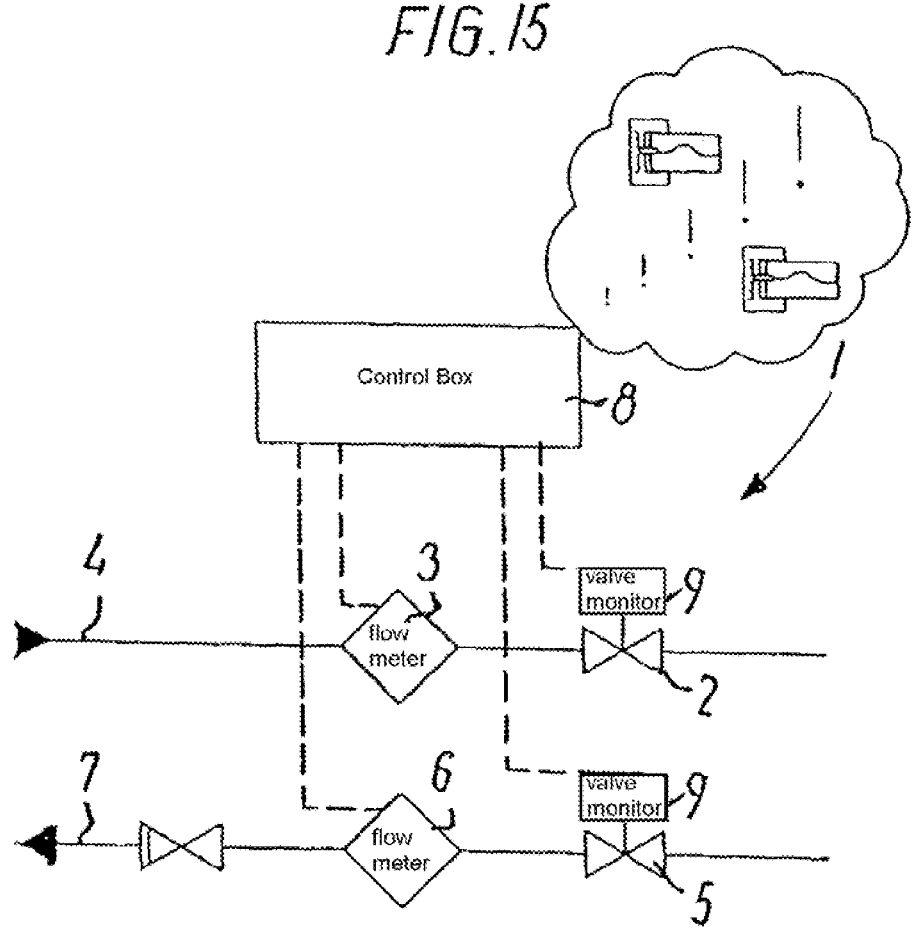

The functionality of the stop valves 2, 5 as well as control of the elasticity and the tightness of the pipe installation during the execution of the given sequence of actions is carried out in that:

the executer applies a close command for the stop valve 2 in the supply pipe 4 of the pipe installation and awaits the expiry of the transit time of the stop valve (see FIG. 13), the executer applies an open command for the stop valve 5 in the return pipe 7 of the pipe installation and awaits the expiry of an adjustable period of time during which the valve monitor for the stop valve in the supply pipe 4 of the pipe installation is active, and at the same time a time track of the flow in the return pipe 7 of the pipe installation is recorded (see FIG. 14), the executer removes the close command for the stop valve 2 in the supply pipe 4 of the pipe installation, activates the analysis apparatus and deactivates itself (see FIG. 15), following which the leak control system 1 assumes a normal monitoring state (see FIG. 16).

Figure 12:
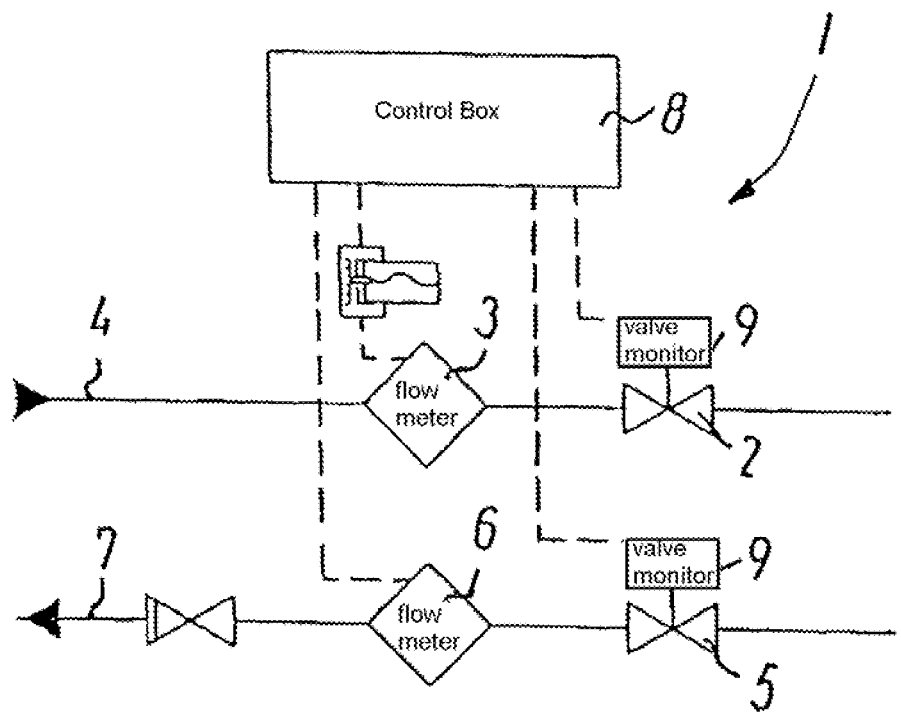
Figure 13:
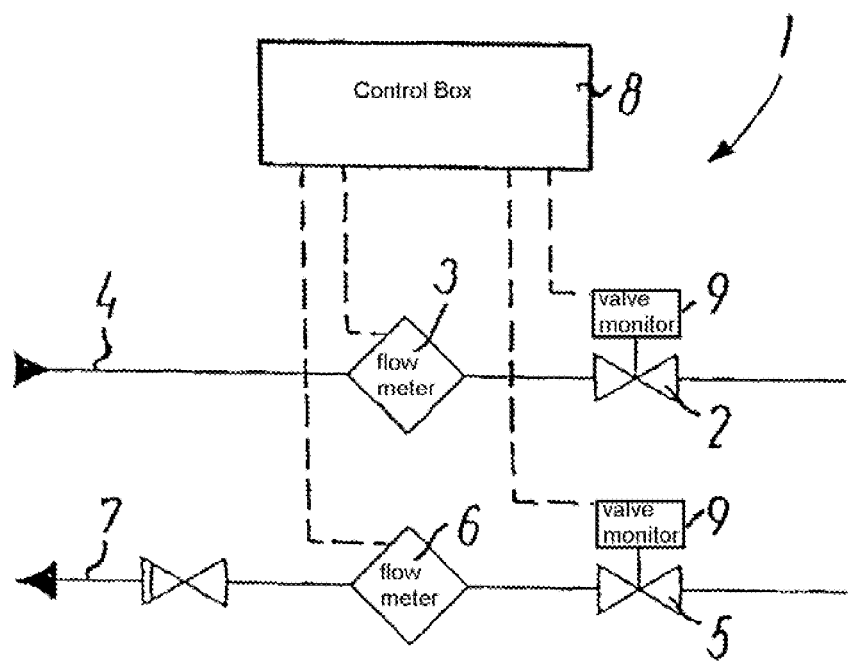
Figure 14:
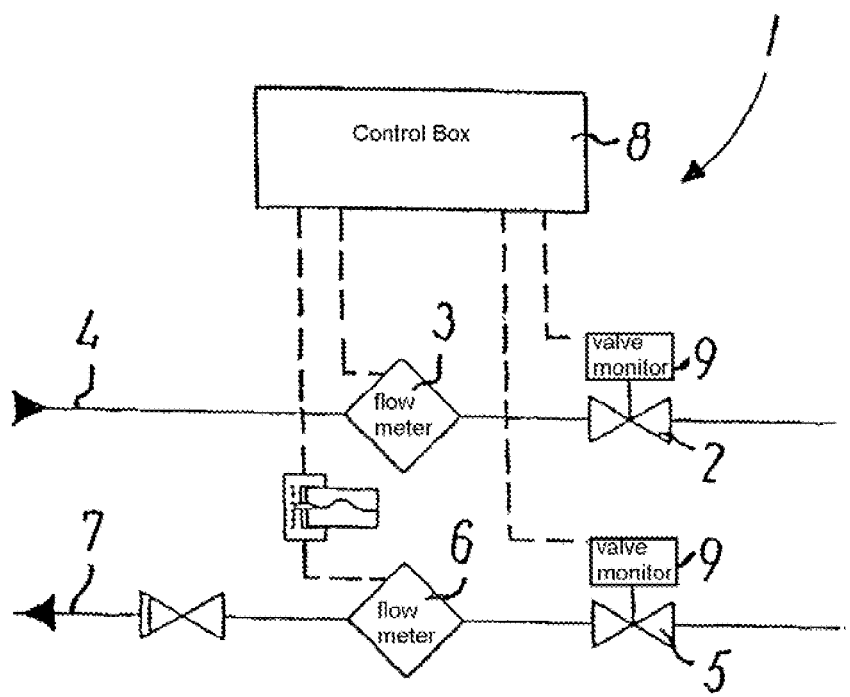
Figure 15:
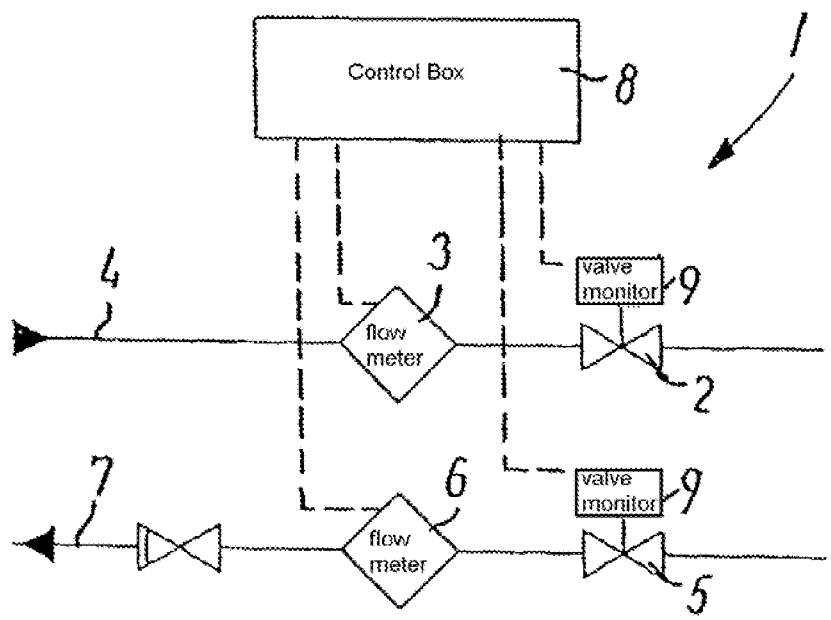

If the stop valve 5 in the return pipe 7 of the pipe installation is controllable, the test is initiated in that:

the executer applies a close command for the stop valve 5 in the return pipe 7 and awaits the expiry of the transit time of the stop valve (see FIG. 11), following which the executer keeps the stop valve 5 in the return pipe 7 of the pipe installation closed for an adjustable period of time, during which the valve monitor 9 for the stop valve 5 is active, and at the same time a time track of the flow in the supply pipe 4 of the pipe installation is recorded (see FIG. 12).

The overall purpose of alternate blocking of the stop valve 2, 5 and flow recording in opposite pipes 4, 7 is to detect whether the pipe installation is tight. In a completely inelastic, including inter alia fully filled, half-blocked pipe installation, no flow is expected through the open stop valve until the volume of the medium contained in the pipe installation is possibly changed because of cooling.

As mentioned, the analysis apparatus examines the time tracks recorded, and spectral or inflexion analysis, e.g., may be used for this.

In case of periodic flow fluctuations with low attenuation, the analysis apparatus cannot detect leakages, and will instead cause the control box 8 to request the user to vent the pipe installation.

In case of periodic flow fluctuations with high attenuation, the analysis apparatus may examine the flow at the end of the time track in order to determine the tightness of the pipe installation. In the absence of flow fluctuations, the flow in the time track directly reflects the tightness of the pipe installation.

In these two cases, the analysis apparatus may compare the flow with a leakage limit, which is optionally adjustable, and allow the leak control system 1 to assume an alarm state when this limit is exceeded.

The method described may also be used in connection with the determination of leakage in the primary circuit and the secondary circuit in hot water containers, heat exchangers and the like, if there is a difference in operating pressure between the primary circuit and the secondary circuit.

The invention claimed is:

1. A method of executing a leak control system (1) comprising at least one stop valve (2) with an associated flow meter (3) arranged in the supply pipe 5 (4) of the pipe installation, and at least one stop valve (5) with an associated flow meter (6) arranged in the return pipe (7) of the pipe installation, said stop valves (2, 5) as well as associated flow meters (3, 6) being connected to a control box (8), characterized in that the control box comprises at least one valve monitor (9) connected to each stop valve (2, 5) to control/record the possible state of the individual stop valve (2, 5): open or closed, and an executer which is started by the control logics of the control box in 15 consideration of the operating conditions of the pipe installation, and which performs a given sequence of actions during which it controls/monitors the valve monitors (9), which leak control system (1), on the basis of start and execution of the sequence of actions, performs a number of measurements and data collections on the basis of which it subsequently evaluates the functionality of the stop valves (2, 5) and/or the elasticity and/or the tightness of the pipe installation.

2. A method according to claim 1, characterized in that the functionality of the stop valves (2, 5) during the execution of the given sequence of actions is determined in that:

the executer applies a close command for the stop valve (2) in the 30 supply pipe (4) of the pipe installation and awaits the expiry of the transit time of the stop valve, the executer removes the close command for the stop valve (5) in the return pipe (7) of the pipe installation and awaits the expiry of the transit time of the stop valve, and during this period the valve monitor (9) for the stop valve (2) is active, the executer removes the close command for the stop valve (2) in the supply pipe (4) of the pipe installation and deactivates itself, following which the leak control system (1) assumes a normal monitoring state.

3. A method according to claim 1, characterized in that the control box (8) additionally comprises an analysis apparatus to record and analyze flow fluctuations in the pipe installation.

4. A method according to claim 3, characterized in that the functionally of the stop valves (2, 5) as well as control of the elasticity and the tightness of the pipe installation during the execution of the given sequence of actions are determined in that:

the executer applies a close command for the stop valve (2) in the supply pipe (4) of the pipe installation and awaits the expiry of the transit time of the stop valve, the executer applies an open command for the stop valve (5) in the 25 return pipe (7) of the pipe installation and awaits the expiry of an adjustable period of time during which the valve monitor (9) for the stop valve (2) in the supply pipe (4) of the pipe installation is active, and at the same time a time track of the flow in the return pipe (7) of the pipe installation is recorded, the executer removes the close command for the stop valve (2) in the supply pipe (4) of the pipe installation, activates the analysis apparatus and deactivates itself, following which the leak control sys- tem (1) assumes a normal monitoring state.

5. A method according to anyone of claims 1-4, characterized in that the stop valve (5) in the return pipe (7) of the pipe installation is controllable.

6. A method according to claim 5, characterized in that the execution of the sequence of actions to determine the functionality of the stop valves (2,5) is initiated in that:

the executer applies a close command for the stop valve (5) in the return pipe (7) of the pipe installation and awaits the expiry of the transit time of the stop valve during which the valve monitor (9) for the stop valve (5) in the return pipe (7) of the pipe installation is active.

7. A method according to claim 5, characterized in that the execution of the sequence of actions to determine the functionality of the stop valves (2, 5) and the regular control of the elasticity and the tightness of the pipe installation are initiated in that:

the executer applies a close command for the stop valve (5) in the return pipe (7) and awaits the expiry of the transit time of the stop valve, following which the executer keeps the stop valve (5) in the return pipe (7) of the pipe installation closed for an adjustable period of time during which the valve monitor (9) for the stop valve (5) is active, and at the same time a time track of the flow in the supply pipe (4) of the pipe installation is recorded.

8. A leak control system (1) in two-stringed pipe installations for performing the method according to claim 5, comprising at least one stop valve (2) with an associated flow meter (3) arranged in the supply pipe (4) of the pipe installation, and at least one stop valve (5) with an associated flow meter (6) arranged in the return pipe (7) of the pipe installation, said stop valves (2, 5) as well as associated flow meters (3, 6) being connected to a control box (8), characterized in that the control box (8) comprises, at least one valve monitor (9) connected to each stop valve (2, 5) to control/record the possible state of the individual stop valve (2, 5): open or closed, and an executer which is staffed by the control logics of the control box in consideration of the operating conditions of the pipe installation, and which performs a given sequence of actions during which it controls/monitors the valve monitors (9), which leakage control system (1), on the basis of start and execution of the sequence of actions, performs a number of measurements and data collections on the basis of which it subsequently evaluates the functionality of the stop valves (2, 5) and/or the elasticity and/or the tightness of the pipe installations.

9. A leak control system (1) according to claim 8, characterized in that the control box (8) additionally comprises an analysis apparatus to record and analyze flow fluctuations in the pipe installation.

10. A leak control system (1) according to claim 8, characterized in that the stop valve (2) in the supply pipe (4) is a controllable valve, while the 1 stop valve (5) in the return pipe (7) is a controllable valve, a mechanical non-return valve (10) or a combination thereof, said stop valves (2, 5) with associated flow meters (3, 6) being arranged in series with the supply pipe (4) and the return pipe (7), respectively.

* * * * *